United States Patent [19]

Huang

[11] Patent Number: 5,024,262

[45] Date of Patent: Jun. 18, 1991

[54] COMPACTLY FOLDABLE AUTOMOBILE SUNSHADE

[76] Inventor: En L. Huang, 1280 Price St., Pomona, Calif. 91767

[21] Appl. No.: 420,936

[22] Filed: Oct. 13, 1989

[51] Int. Cl.$^5$ ............................................. B60J 3/00
[52] U.S. Cl. .............................. 160/370.2; 160/329; 296/97.8
[58] Field of Search ............... 160/370.2, 84.1, 351, 160/329; 296/97.7, 97.8

[56] References Cited

U.S. PATENT DOCUMENTS

| | | |
|---|---|---|
| 1,732,447 | 10/1929 | Crane . |
| 1,790,333 | 1/1931 | Tubman . |
| 1,808,652 | 6/1931 | Gump . |
| 2,596,836 | 5/1952 | Bruhl . |
| 3,336,969 | 8/1967 | Marchman . |
| 4,397,346 | 8/1983 | Chumbley et al. ............... 160/84.1 |
| 4,560,245 | 12/1985 | Sarver . |
| 4,561,039 | 3/1987 | Richards . |
| 4,647,102 | 3/1987 | Ebrahimzadeh . |
| 4,671,558 | 6/1987 | Cline . |
| 4,736,980 | 4/1988 | Eubanks . |
| 4,763,947 | 8/1988 | Gregg . |
| 4,775,180 | 10/1988 | Phillips . |
| 4,784,426 | 11/1988 | Mannisto-Iches . |
| 4,790,591 | 12/1988 | Miller . |
| 4,815,784 | 3/1989 | Zheny . |
| 4,818,007 | 4/1989 | Mahoney . |

Primary Examiner—Blair M. Johnson
Attorney, Agent, or Firm—Cislo & Thomas

[57] ABSTRACT

An automobile window sunshade having a particularly simple structure and capable of easily being folded into a compact configuration for storage is provided. The sunshade comprises a single elongated loop of a thin strip of spring-like material covered by a sheet of one or more layers of a flexible material. The shape of the elongated loop can vary from a generally rectangular shape with slightly rounded corners to an oval or generally elliptical shape. One or both of the two major surfaces of the sheet are adapted to reflect light and heat radiation from the sun. In its normally open configuration, the sunshade is placed against the inside surface of an automobile windshield or window with a reflective surface facing outward. The single elongated fabric-covered loop of the sunshade can be easily twisted and folded into a compact configuration consisting of a series of smaller concentric loops and fabric layers. The sunshade may additionally comprise a means for maintaining the compact configuration for storage.

14 Claims, 4 Drawing Sheets

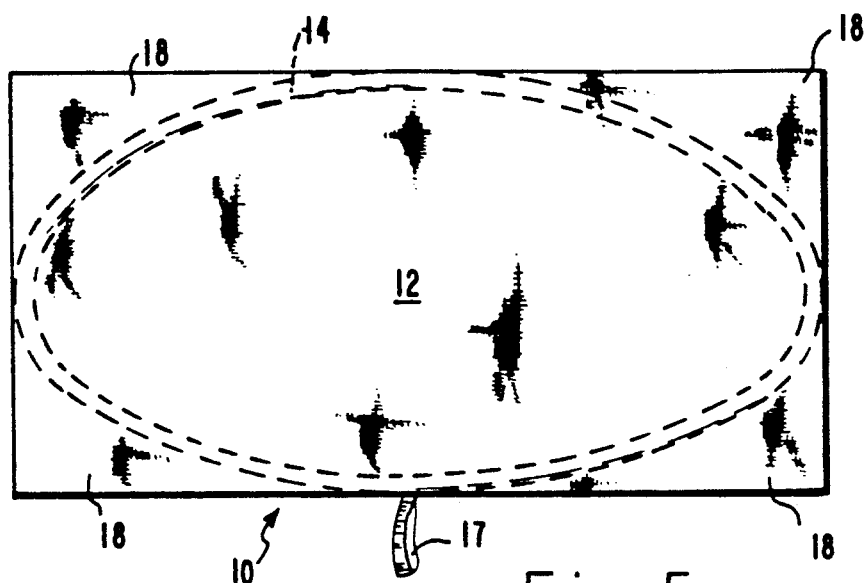
Fig. 5
Fig. 6
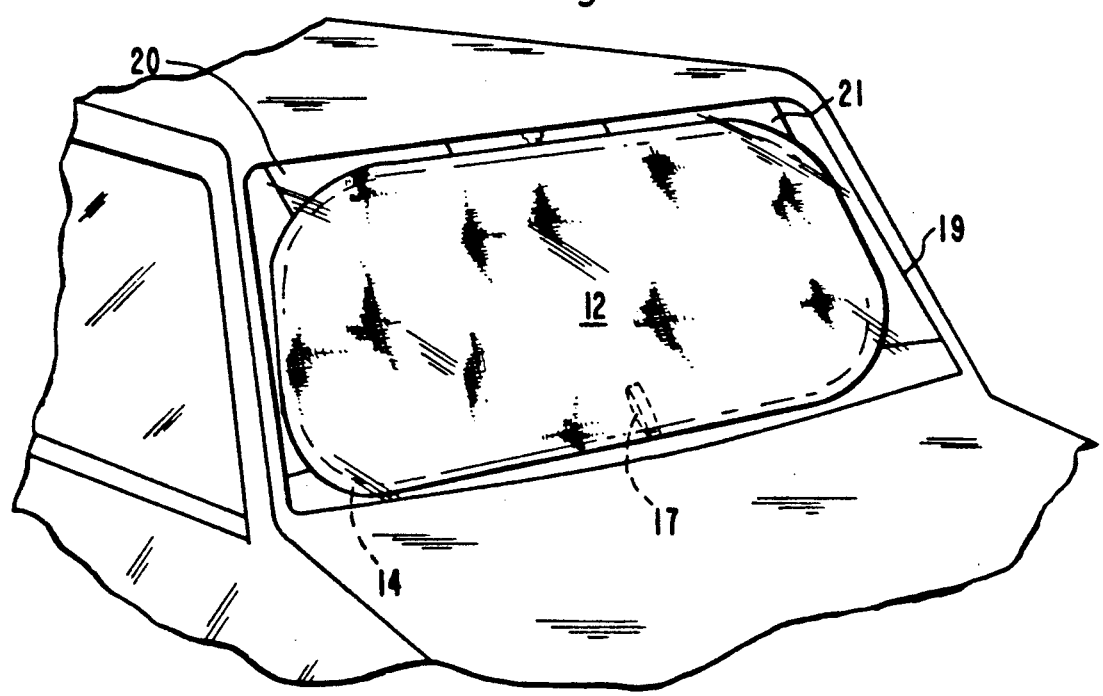

COMPACTLY FOLDABLE AUTOMOBILE SUNSHADE

BACKGROUND OF THE INVENTION

This invention relates to sunshades or sunshields for automobiles, and in particular to a sunshade of very simple construction which can be reduced easily to a compact configuration.

There exists a need for a low-cost, easily manufactured, efficient sunshade which can be placed against an automobile windshield or window to shield against the light and heat from the sun.

Ideally such a sunshade would have a simple structure, be easy to deploy for use, and be easy to collapse into a compact configuration for storage.

One of the prior art sunshield devices is disclosed in U.S. Pat. No. 4,815,784 to Zheng, issued on Mar. 28, 1989. This patent discloses a collapsible elongated sunshield including a plurality of adjacent flexible loop members covered by a fabric material. The loop members substantially support the fabric in particular areas to provide for loop portions and an interconnecting portion forming a hinge between each loop portion. The loop portions of the fabric are folded on top of each other about the hinge portion to have the loop members and associated fabric overlaying each other. The overlaying loop members are collapsed by twisting and folding to form a plurality of concentric loop rings and layers of fabric to substantially reduce the size of the sunshield.

SUMMARY OF THE INVENTION

It is an object of the present invention to provide an automobile sunshade having a particularly simple structure consisting of a single elongated loop of spring-like material covered by a thin flexible material to form a sheet of one or more layers.

It is another object of the present invention to provide an automobile sunshade comprising a fabric-covered elongated loop which can be easily and conveniently twisted and folded into a compact configuration for storage.

It is yet another object of the present invention to provide an automobile sunshade which requires a minimum amount of material and is simple and economical to manufacture.

Another object of the present invention is to provide an automobile sunshade which has at least one major surface that is adapted to reflect a substantial fraction of the heat and light radiation incident upon it.

Still another object of the present invention is to provide an automobile sunshade which comprises a fabric-covered single loop of generally rectangular or oval shape.

Another object of the invention is to provide an automobile sunshade comprising a sheet of flexible material with a continuous strip of spring-like material attached along the perimeter of the sheet.

Yet one more object of the present invention is to provide an automobile sunshade including a means for maintaining a compact configuration of the sunshade when it is not in use.

Still another object of the present invention is to provide an automobile sunshade having one or both of its major surfaces metallized to reflect visible and infrared radiation, especially from the sun.

An additional object of the invention is to provide an automobile sunshade which when deployed for use has an open, extended configuration maintained by a single closed loop of a spring-like metal or plastic material in the form of a thin strip or wire.

In accordance with the present invention in a preferred embodiment, a compactly foldable automobile sunshade comprises a single elongated loop of a thin strip of spring-like material covered by a sheet of one or more layers of a flexible material. One or both of the two major surfaces of the sunshade are adapted to reflect sunlight and heat radiation from the sun. In its normally open configuration, the sunshade of the present invention is placed against the inside surface of an automobile windshield or window with the reflective side of the sunshade facing outward. Light and heat radiation from the sun is thereby prevented from reaching the interior of the automobile and causing heat buildup and deleterious effects on the dashboard, seat covers, steering wheel, and other items making up the interior of the automobile.

The single elongated, fabric-covered loop of the sunshade can be easily twisted and folded into a compact configuration consisting of a series of smaller concentric loops and fabric layers. In its compact configuration, the sunshade is easily stored. The sunshade may additionally comprise a means for maintaining the compact configuration for storage.

The exact shape of the elongated loop of spring-like material can vary from a generally rectangular shape with slightly rounded corners to an oval or generally elliptical shape. The thin strip of spring-like material used to maintain the shape of the sunshade in its open configuration can be secured to the sheet of flexible material making up the major part of the sunshade along its outer perimeter, or, in variations on the preferred embodiment, portions of the sheet of flexible material may extend beyond points at which the strip of spring-like material is secured.

Because the sunshade of the present invention comprises only a single loop, it has the advantage of eliminating a substantial amount of material needed for constructing sunshades comprising a plurality of loops. Furthermore, the single elongated loop of the present invention is easier to fold in practice than a sunshade consisting of multiple loops.

BRIEF DESCRIPTION OF THE DRAWINGS

FIG. 5 is a top plan view of the embodiment shown in FIG. 4, but with an elliptical loop;

FIG. 6 is a fragmented perspective view of the sunshade installed inside an automobile against the windshield;

DESCRIPTION OF THE PREFERRED EMBODIMENTS

Figure 1:
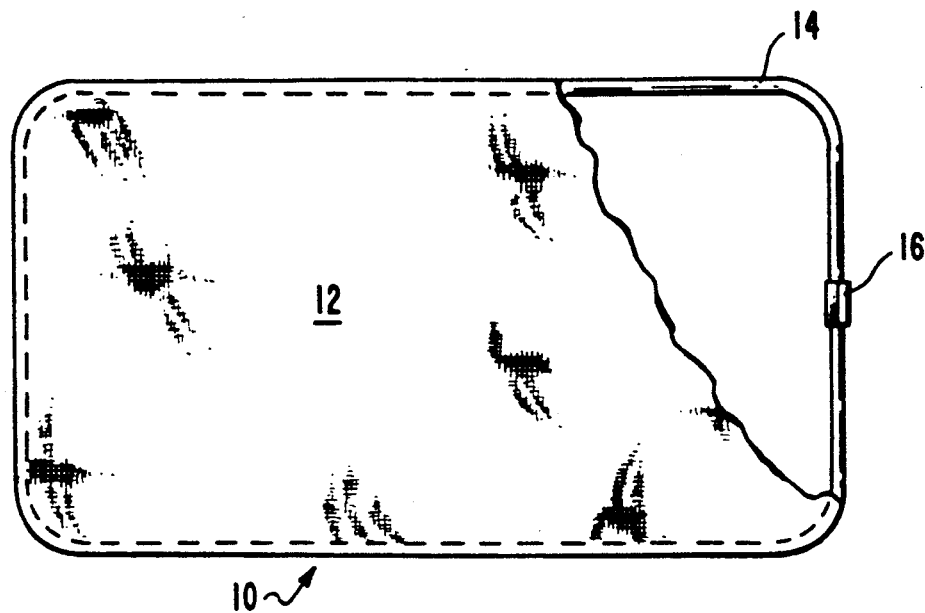
FIG. 1 is a top plan view, partly broken away, of the automobile of the present invention in the preferred embodiment.

Referring to the figures of drawings wherein like reference numerals designate like elements throughout, FIG. 1 depicts a preferred embodiment of the compactly foldable automobile sunshade 10 of the present invention. For ease of illustration and description, the drawings illustrate only the pertinent features of the present invention and do not show the remaining conventional features.

In the preferred embodiment, the automobile sunshade 10 comprises a generally rectangular sheet 12 of one or more layers of flexible material with a thin strip or wire 14 of a spring-like material secured to the perimeter of sheet 12. Sheet 12 can be conveniently made of one or two layers of a densely woven fabric. Alternative materials for sheet 12 include thin plastic, reinforced paper, or plasticized metal foil. Strip 14 can comprise a thin strip of spring steel or a suitable plastic material having sufficient springiness.

If sheet 12 consists of only one layer of material, strip 14 can be secured to sheet 12 by sewing strip 14 in a hem along the perimeter of sheet 12. If sheet 12 consists of two layers of material, the outer perimeters of both layers can be sewn together with strip 12 contained between the layers of material. Other ways of securing strip 14 to sheet 12 will occur to those skilled in the art.

As shown in the broken away portion of FIG. 1, the single loop of strip 14 can be formed by connecting the free ends of an elongated strip of material after it has been bent into the required shape. Connector 16 can comprise a short piece of metal, the ends of which are crimped or folded over to secure the free ends of strip 14. Alternatively, a continuous loop could be fabricated by welding the ends together in the case of certain metals, or forming one continuous loop of material in the case of certain plastics.

At least one of the major surfaces of sheet 12 is adapted to reflect light and heat radiation. In the preferred embodiment, the surface of sheet 12 adapted to reflect radiation comprises a metallized fabric. A less expensive, though correspondingly less effective, expedient would be to choose a white fabric for the reflecting surface.

The loop of strip 14 which maintains sunshade 10 in an open configuration suitable for use in association with the windshield or window of an automobile can have several different shapes. In the preferred embodiment, the shape of the loop is generally rectangular with rounded corners.

Figure 2:
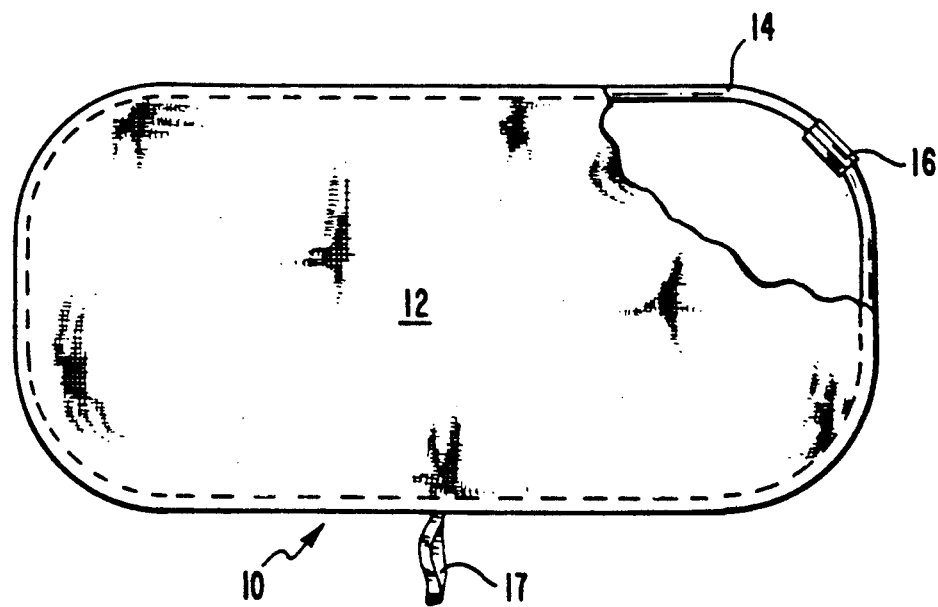
FIG. 2 is a top plan view, partly broken away, of the automobile sunshade additionally comprising a loop of elastic material attached to its perimeter and having more rounded corners than in FIG. 1.

Referring to FIG. 2, a sunshade 10 is shown with its corners more rounded than those in FIG. 1. An additional optional feature shown in FIG. 2 is a loop 17 of elastic material attached to sheet 12 at a point along its perimeter.

Figure 3:
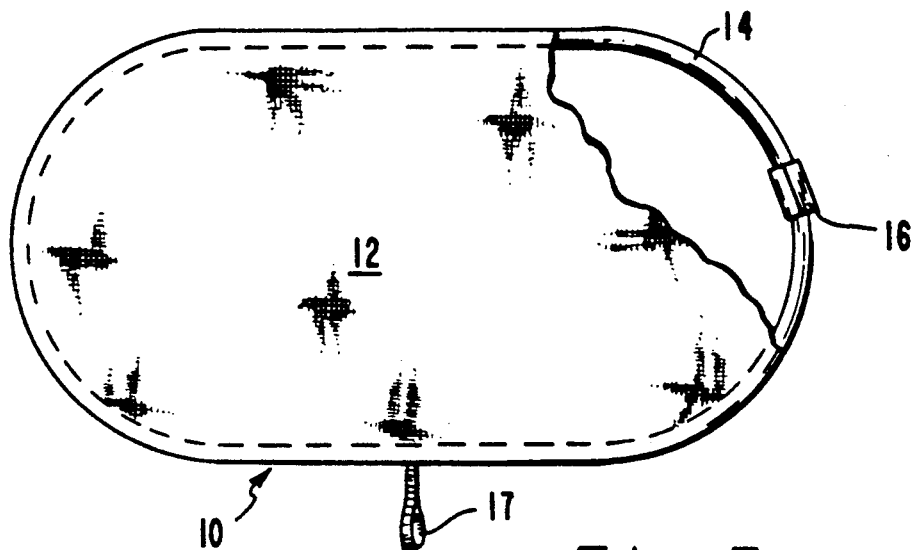
FIG. 3 is a top plan view, partly broken away, of the automobile sunshade with a shape comprising two opposed semicircles connected by a rectangular portion.

In variants of the rounded-corner structure, as the radius of curvature of the corners increases, a limit is reached in which the closed loop assumes the shape of two substantially identical, opposed semicircles joined by a rectangular panel, as shown in FIG. 3.

Figure 4:
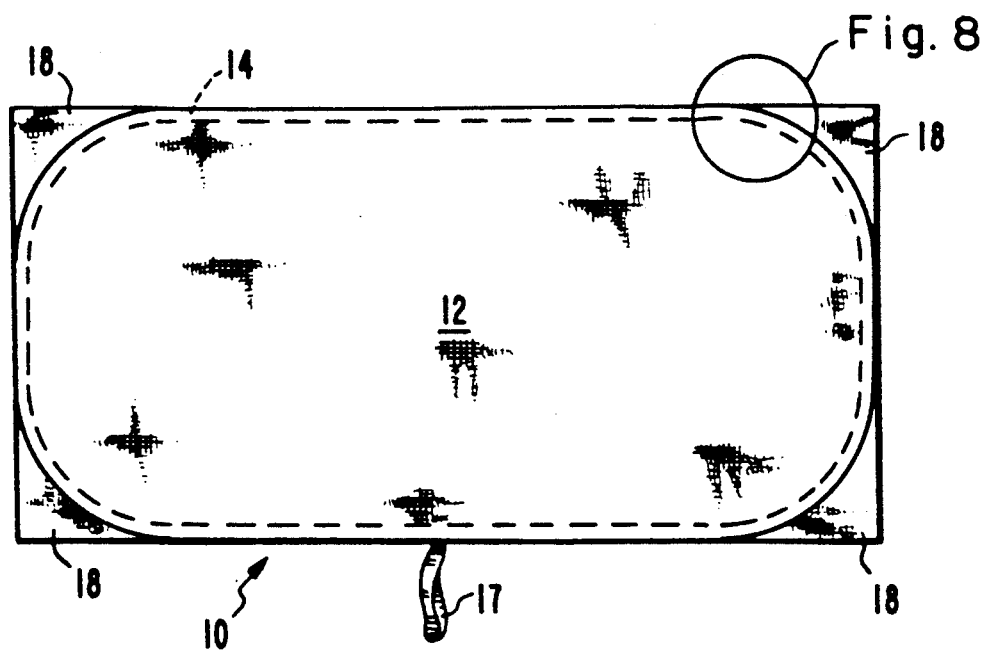
FIG. 4 is a top plan view of another embodiment of the automobile sunshade of the present invention.

Referring to FIG. 4, an alternative embodiment of sunshade 10 comprises a rectangular sheet 12 of flexible material to which a closed loop of a strip 14 of spring-like material is secured at points inside the perimeter of sheet 12. In this embodiment of sunshade 10, corner portions 18 of sheet 12 lie outside the loop formed by strip 14.

Referring to FIG. 5, the alternative embodiment of sunshade 10 is shown with an elliptical loop of strip 14 of spring-like material secured to sheet 12.

FIG. 6 shows sunshade 10 deployed against the inside surface of an automobile windshield 19. Sun visors 20 and 21, shown in phantom outline, have been rotated downward toward windshield 19 and serve to hold sunshade 10 in place against windshield 19. For smaller windshields or side windows, the shape of the loop of strip 14 can be deformed somewhat. In FIG. 6 sunshade 10 is held in place mainly by spring forces against portions of the car surrounding windshield 19.

Figure 7:
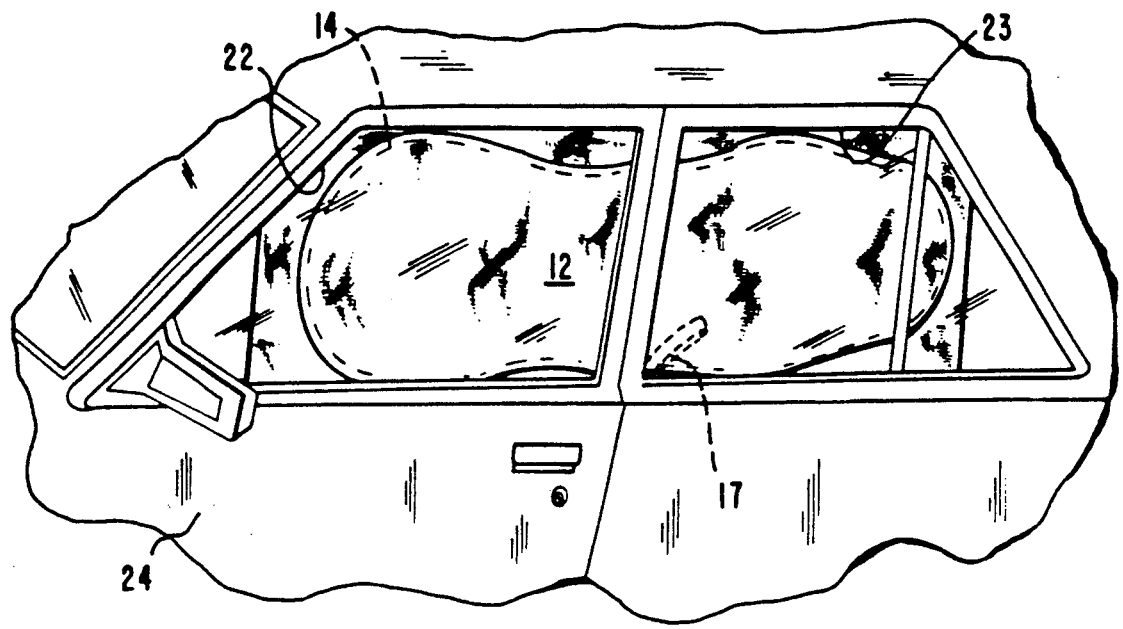
FIG. 7 is a fragmented perspective view of the sunshade installed inside the side windows of an automobile.

Referring to FIG. 7, sunshade 10 is shown installed inside the side windows 22 and 23 of automobile 24. The deformed loop 14 exerts spring forces against the surroundings of the car windows to hold sunshade 10 in place.

Sunshade 10 can be easily and conveniently collapsed into a compact configuration for storage when not in use. The preferred method of collapsing sunshade 10 comprises grasping the loop of strip 14 at its extreme ends, twisting the ends in opposite screw senses while bringing them toward each other, and forming three interleaved portions of sheet 12 consisting of generally circular loops of fairly small radius. Sunshade 10 can be maintained in its collapsed configuration, for example, by slipping an elastic band around the generally circular loops along a diameter.

As shown in FIG. 5, loop 17 of elastic material can be sewn or otherwise attached to sheet 12 at a point along its perimeter, preferably midway between extreme opposite ends of sheet 12. In its compact configuration, sunshade 10 has a diameter which is considerably smaller than the maximum dimension of the structures shown in FIGS. 1–5. For example, for a sunshade 10 having its longest dimension equal to four feet, the diameter of the sunshade in its compact configuration is approximately one foot.

Figure 8:
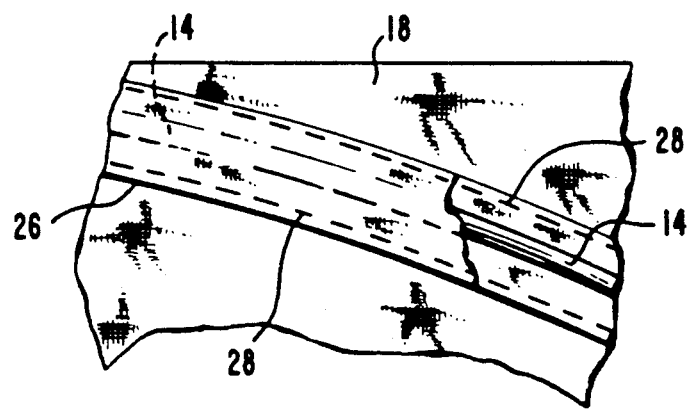
FIG. 8 is a fragmented detail plan view of the portion indicated in FIG. 4.

Referring to FIG. 8, the details of securing the strip 14 to sheet 12 can be seen for the case of the embodiment shown in FIG. 4. A narrow strip 26 of flexible material overlays spring-like strip 14 and is sewn with stitches 28 to sheet 12 on both sides of strip 14. This method of securing strip 14 to sheet 12 could also be employed in the embodiments of the invention shown in FIGS. 1–3.

The present invention provides for an automobile window sunshade in which a single fabric-covered loop of spring-like material has an elongated shape which conforms to that of a windshield or other window. When placed adjacent the window, a surface of the sunshade adapted to reflect light and heat radiation from the sun prevents heating or damage to the interior materials of the automobile. In its collapsed, compact configuration, the sunshield of the present invention can be conveniently stored underneath a seat or in a side pocket of the automobile door.

It should be understood that the invention in its broader aspects is not limited to the specific embodiments shown and described herein, but departures may be made therefrom within the scope of the appended claims without departing from the principles of the invention and without sacrificing its chief advantages. All such modifications and changes will make themselves apparent to those of ordinary skill in the art and all such changes and modifications are intended to be covered by the appended claims.

What is claimed is:

1. An automobile window sunshade comprising:
   a sheet of at least one layer of a flexible first material, said sheet having front and back surfaces, with at least one of said surfaces including a material suitable for reflecting light and heat radiation; and
   a single closed loop of a strip of a spring-like second material secured to said sheet throughout an entire perimeter thereof;
   wherein said sunshade can be (1) deployed in a first, open configuration, said singular closed loop being continuously deformable to a predetermined contour of said automobile window, and, (2) twisted to form at least a pair of sections, said sections being foldable in layered fashion to form a second, compact configuration for storage; and
   wherein restoring spring forces of said spring-like second material of said strip makes possible the retention of said sunshade inside a surrounding frame of a window in an automobile.

2. The automobile window sunshade of claim 1 wherein said closed loop has the general shape of a rectangle with rounded corners.

3. The automobile window sunshade of claim 1 wherein said closed loop has the general shape of two substantially identical semicircles connected by a rectangle having one side equal in length to twice the radius of said semicircles.

4. The automobile window sunshade of claim 1 where said closed loop has the general shape of an elongated oval.

5. The automobile window sunshade of claim 1 wherein said sheet is larger in area than said closed loop and has a generally rectangular shape; and wherein said closed loop is secured to said sheet at points within the perimeter of said sheet, so that parts of said sheet lie outside said closed loop.

6. The automobile window sunshade of claim 1 wherein said strip of spring-like material comprises spring steel.

7. The automobile window sunshade of claim 1 wherein said strip is sewn into a hem of said sheet along the perimeter thereof.

8. The automobile window sunshade of claim 1 wherein said strip comprises a springy plastic material.

9. The automobile window sunshade of claim 1 wherein said strip of spring-like material comprises a metal wire.

10. The automobile window sunshade of claim 1 wherein said sheet has two congruent layers sewn together along the perimeter of said sheet to contain said strip of spring-like material between said layers.

11. The automobile window sunshade of claim 1 wherein said at least one surface comprises a densely woven white fabric.

12. The automobile window sunshade of claim 1 wherein said at least one surface comprises a metallized fabric.

13. The automobile window sunshade of claim 1 further comprising means for maintaining said sunshade in said compact configuration.

14. The automobile window sunshade of claim 13 wherein said means for maintaining comprises a loop of elastic material attached to said sheet near the perimeter thereof.

* * * * *

REEXAMINATION CERTIFICATE (2337th)

United States Patent [19]
Huang

[11] B1 5,024,262
[45] Certificate Issued Jul. 12, 1994

[54] COMPACTLY FOLDABLE AUTOMOBILE SUNSHADE

[76] Inventor: En L. Huang, 1280 Price St., Pomona, Calif. 91767

Reexamination Request:
No. 90/003,200, Sep. 20, 1993

Reexamination Certificate for:
Patent No.: 5,024,262
Issued: Jun. 18, 1991
Appl. No.: 420,936
Filed: Oct. 13, 1989

[51] Int. Cl.⁵ .............................................. B60J 3/00
[52] U.S. Cl. ................................ 160/370.2; 160/329; 296/97.8
[58] Field of Search ........................................ 362/341

[56] References Cited
U.S. PATENT DOCUMENTS
4,815,784 3/1989 Zheng .

FOREIGN PATENT DOCUMENTS
1562282 5/1978 United Kingdom .

OTHER PUBLICATIONS
Retail Price List, by The F. J. Westcott Co., published Jan. 1, 1989, identifying the Monte's Illuminator on the third page.
Brochure for the Monte's Illuminator, published by the Westcott Co.

Primary Examiner—Blair M. Johnson

[57] ABSTRACT

An automobile window sunshade having a particularly simple structure and capable of easily being folded into a compact configuration for storage is provided. The sunshade comprises a single elongated loop of a thin strip of spring-like material covered by a sheet of one or more layers of a flexible material. The shape of the elongated loop can vary from a generally rectangular shape with slightly rounded corners to an oval or generally elliptical shape. One or both of the two major surfaces of the sheet are adapted to reflect light and heat radiation from the sun. In its normally open configuration, the sunshade is placed against the inside surface of an automobile windshield or window with a reflective surface facing outward. The single elongated fabric-covered loop of the sunshade can be easily twisted and folded into a compact configuration consisting of a series of smaller concentric loops and fabric layers. The sunshade may additionally comprise a means for maintaining the compact configuration for storage.

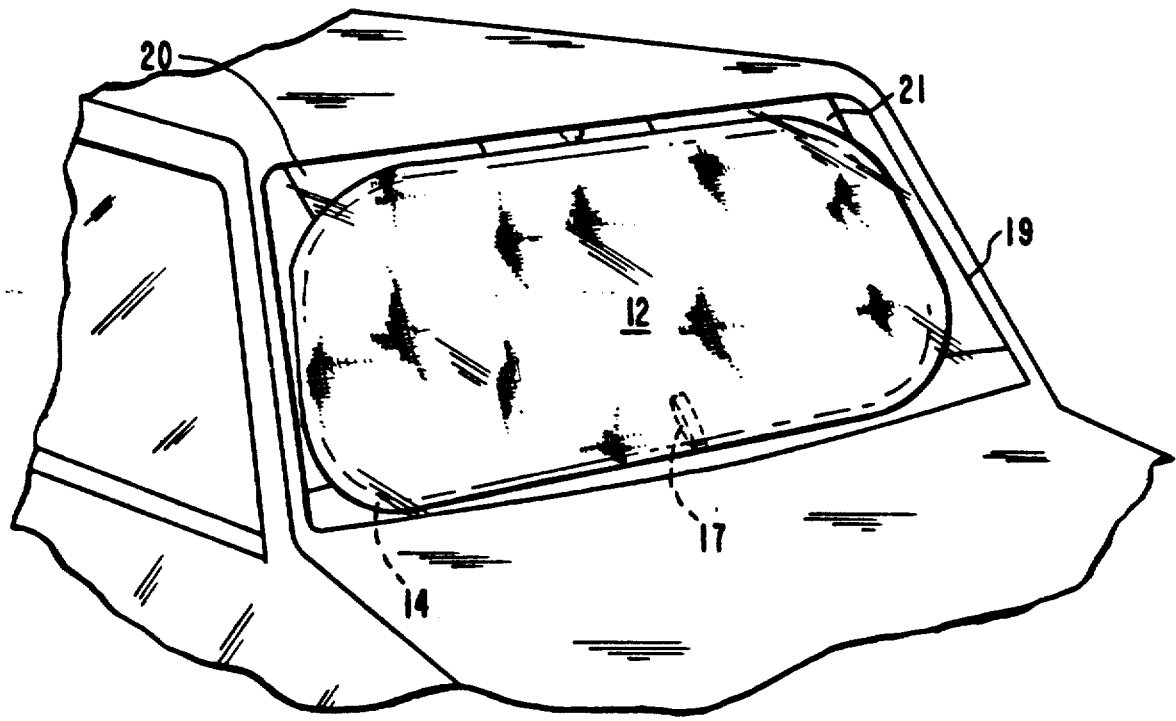

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-14 are cancelled.

New claims 15-28 are added and determined to be patentable.

15. *A vehicle sunshade system comprising:*
   *(a) a vehicle window having a surrounding frame internal said vehicle;*
   *(b) a sheet of at least one layer of a flexible first material, said sheet having frontal and rear surfaces, at least one of said surfaces including a material suitable for reflecting light and heat radiation; and,*
   *(c) a single closed loop of a strip of a spring-like second material secured to said sheet throughout an entire perimeter thereof, said spring-like second material having restoring spring forces for bearing against at least a portion of said frame of said vehicle window for maintaining said flexible first material and said spring-like second material in fixed relation adjacent a surface of said vehicle window, wherein said combined flexible first material and said spring-like second material can be (1) deployed in a first, open configuration, said single closed loop being substantially continuously deformable to a predetermined contour of said vehicle window, and, (2) twisted to form at least a pair of sections, said sections being foldable in layered fashion to form a second, compact configuration for storage.*

16. *A vehicle sunshade system comprising:*
   *(a) a vehicle window having a surrounding frame internal said vehicle;*
   *(b) at least one visor rotatably mounted adjacent said surrounding frame;*
   *(c) a sheet of at least one layer of a flexible first material, said sheet having frontal and rear surfaces, at least one of said surfaces including a material suitable for reflecting light and heat radiation; and,*
   *(d) a single closed loop of a strip of a spring-like second material secured to said sheet throughout an entire perimeter thereof, said spring-like second material for resiliently bearing against at least a section of said frame of said vehicle window and said visor being adjustably rotated into contiguous relation with said sheet rear surface for maintaining said combined flexible first material and said spring-like second material in fixed relation adjacent a surface of said vehicle window, wherein said combined flexible first material and said spring-like second material can be (1) mounted in an open configuration to said vehicle window frame, said single closed loop being substantially continuously deformable at a predetermined contour of said vehicle window, said flexible first material being sandwiched between an interior surface of said vehicle window and said visor, and, (2) twisted to form at least a pair of combined sections, said combined sections being foldable in layered fashion to form a compact configuration for storage.*

17. *The vehicle window sunshade system as recited in claims 15 or 16 wherein said closed loop has the general shape of a rectangle with rounded corners.*

18. *The vehicle window sunshade system as recited in claims 15 or 16 wherein said closed loop has the general shape of two substantially identical semicircles connected by a rectangle having one side equal in length to twice the radius of said semicircles.*

19. *The vehicle window sunshade system has recited in claims 15 or 16 where said closed loop has the general shape of an elongated oval.*

20. *The vehicle window sunshade system as recited in claims 15 or 16 wherein said sheet is larger in area than said closed loop and has a generally rectangular shape; and wherein said closed loop is secured to said sheet at points within the perimeter of said sheet, so that parts of said sheet lie outside said closed loop.*

21. *The vehicle window sunshade system as recited in claims 15 or 16 wherein said strip of spring-like material comprises spring steel.*

22. *The vehicle window sunshade system as recited in claims 15 or 16 wherein said strip is sewn into a hem of said sheet along the perimeter thereof.*

23. *The vehicle window sunshade system as recited in claims 15 or 16 wherein said strip comprises a springy plastic material.*

24. *The vehicle window sunshade system as recited in claims 15 or 16 wherein said strip of spring-like material comprises a metal wire.*

25. *The vehicle window sunshade system as recited in claims 15 or 16 wherein said sheet has two congruent layers sewn together along the perimeter of said sheet to contain said strip of spring-like material between said layers.*

26. *The vehicle window sunshade system as recited in claims 15 or 16 wherein said at least one surface comprises a densely woven white fabric.*

27. *The vehicle window sunshade system as recited in claims 15 or 16 wherein said at least one surface comprises a metallized fabric.*

28. *The vehicle window sunshade system as recited in claims 15 or 16 further comprising means for maintaining said sunshade in said compact configuration, said means for maintaining includes a loop of elastic material attached to said sheet near said perimeter thereof.*

* * * * *